Figure 1:
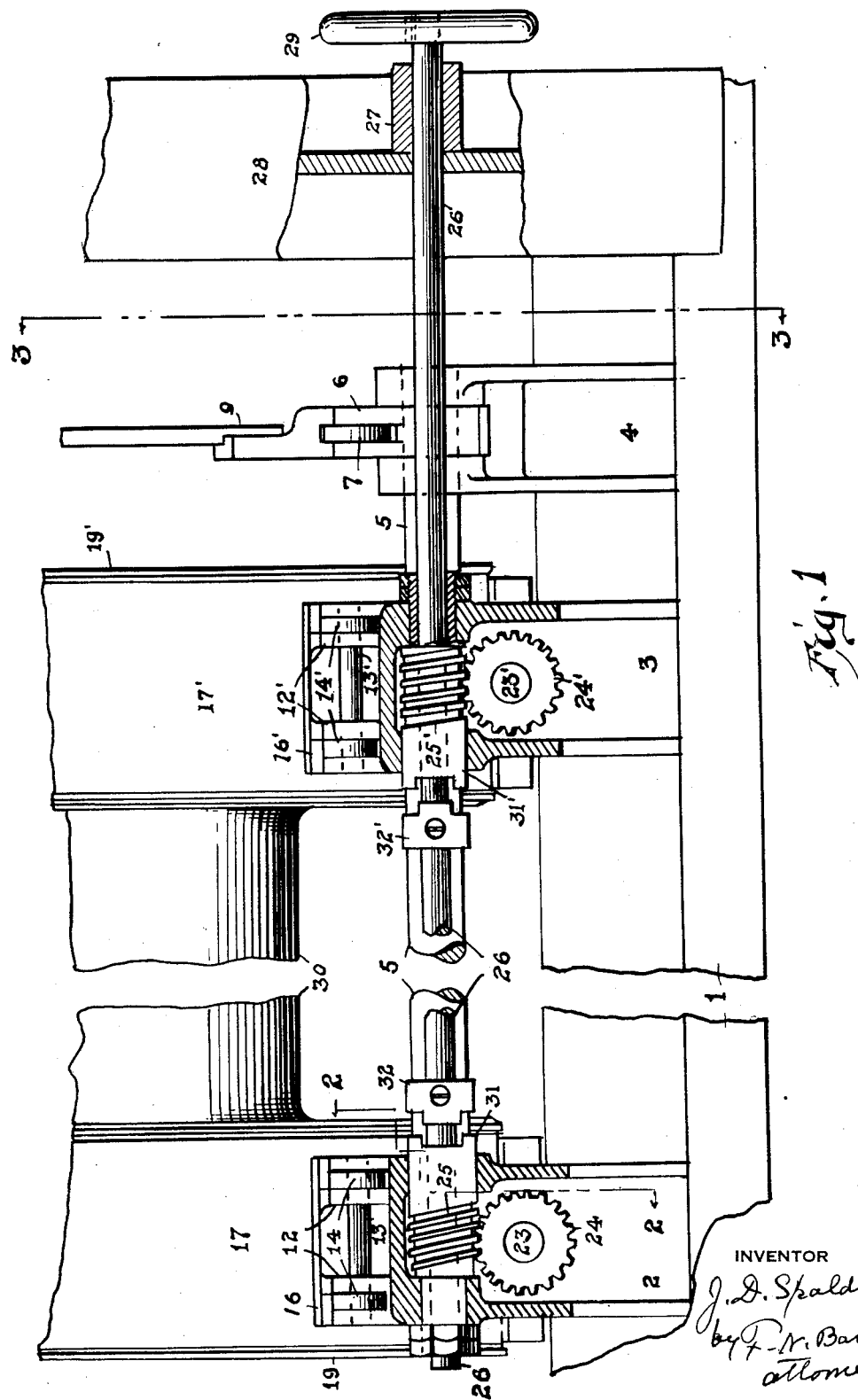

Dec. 12, 1933.  J. D. SPALDING  1,939,601

BRAKE BAND ADJUSTING MECHANISM

Filed Oct. 17, 1930  2 Sheets-Sheet 1

INVENTOR
J. D. Spalding
by F. N. Barber
attorney

Dec. 12, 1933.    J. D. SPALDING    1,939,601
BRAKE BAND ADJUSTING MECHANISM
Filed Oct. 17, 1930    2 Sheets-Sheet 2
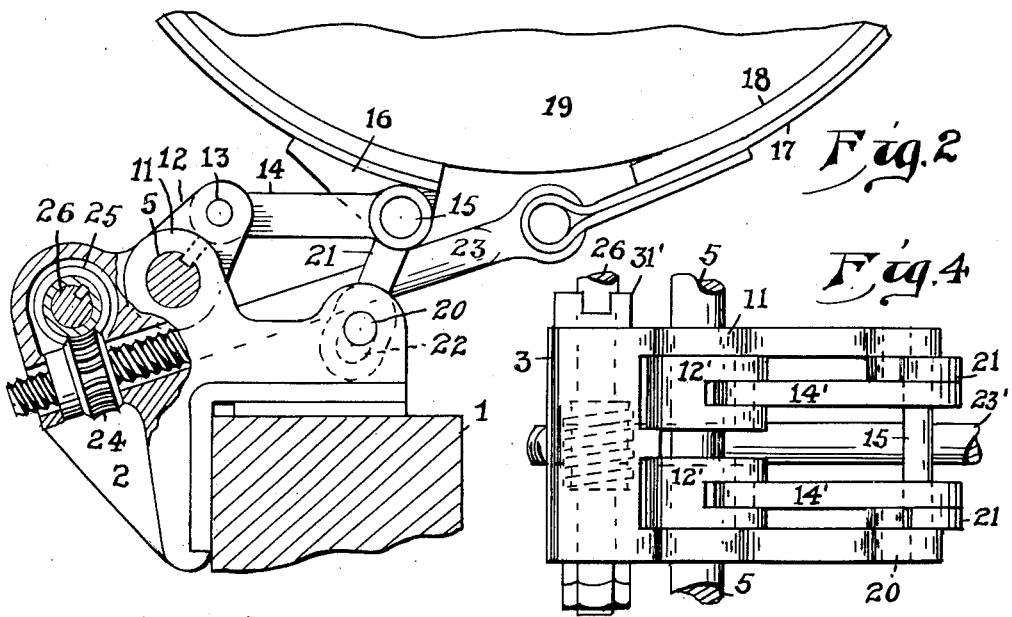
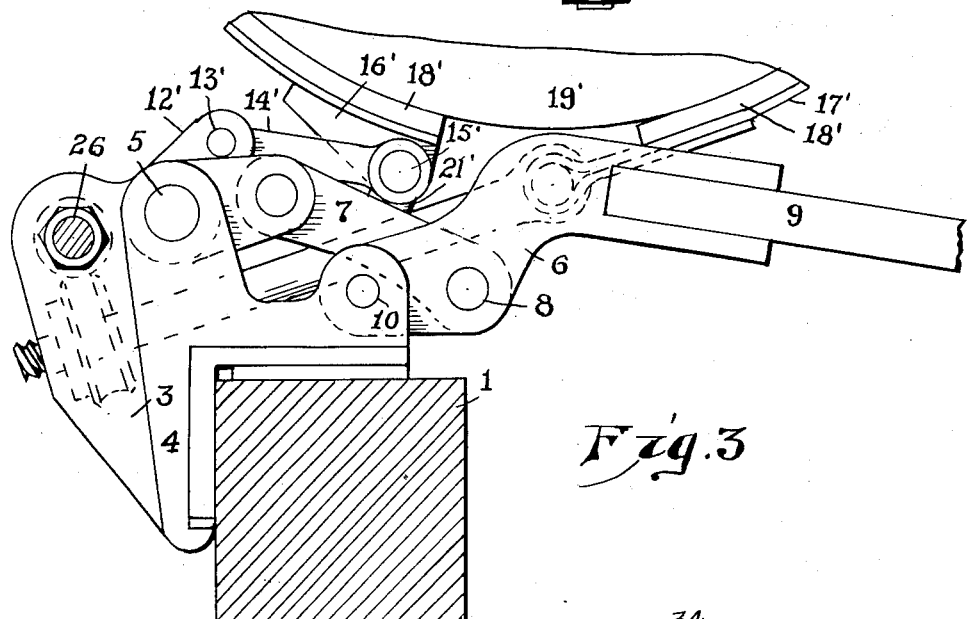
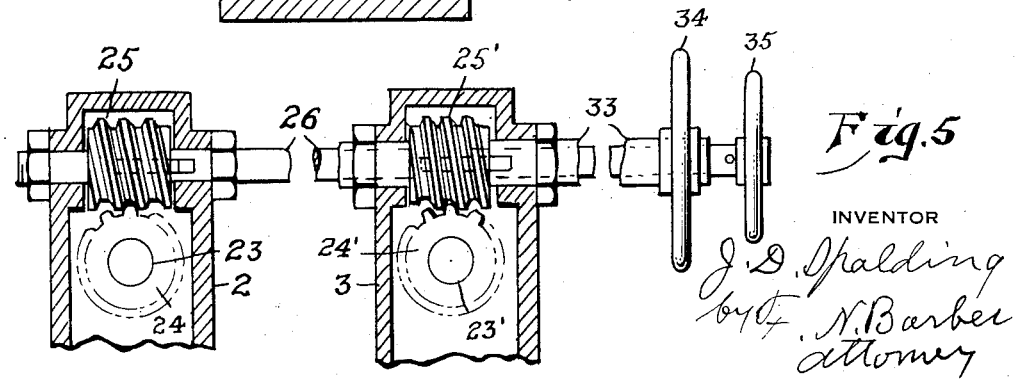
INVENTOR
J. D. Spalding
by F. N. Barber
Attorney Patented Dec. 12, 1933

1,939,601

UNITED STATES PATENT OFFICE 1,939,601

BRAKE BAND ADJUSTING MECHANISM

John D. Spalding, Crafton, Pa., assignor to The National Supply Company, Toledo, Ohio, a corporation of Ohio Application October 17, 1930. Serial No. 489,315

7 Claims. (Cl. 188—196)

My invention relates to adjusting mechanisms for brake bands.

This invention pertains particularly to adjusting mechanism for the brake bands on the drums of draw works used in connection with well drilling apparatus, but it may be applied to other types of apparatus. It is the principal object of this invention to provide independent adjusting means for the said brake bands in order to remove some danger from the task of the operators of the brakes. I provide the said adjusting means with operating device beyond the ends of the drum, but located in close proximity to the levers which control other parts of the mechanism besides the brakes.

Referring to the accompanying drawings, Fig. 1 is a side elevation of an apparatus embodying my invention, parts of the apparatus being broken away and shown in section. The view is taken perpendicular to a plane including the centers of the shafts 5 and 26. Figs. 2 and 3 are sections on the lines 2—2 and 3—3 respectively on Fig. 1. Fig. 4 is a plan view of the parts below the brake band 17 in Fig. 2. Fig. 5 is a vertical section of a modification of my invention, parts being omitted and broken away.

On the drawings, 1 designates a base on which are seated three brackets 2, 3, and 4. 5 is a shaft extending through all three of the brackets and is provided with the forked arm 6. This arm receives one end of the link 7 whose remaining end is connected by the pivot 8 to the lever 9, the lever 9 being on the shaft 10 carried by the bracket 4.

The bracket 2 has at its upper side the ears 11 in which the shaft 5 turns. This bracket has between the ears 11 two pairs of arms 12. Each pair of arms is connected by the pivot 13 to the links 14. The ends of the links not connected to the pivot 13 are connected by the pivot 15 to the bracket 16 attached to one end of the brake band 17 which carries the brake lining 18 bearing upon the periphery of the brake drum 19. The pivot 15 is pivotally connected to the pivot 20 in the bracket 2 by the links 21. The links 21 have the openings 22 for the pivot 20 somewhat elongated as shown in dotted lines in Fig. 2.

The remaining end of the brake band 17 is connected to one end of the adjusting anchor bolt 23 which extends through the bracket 2. The nut 24 carried by this bracket is threaded upon the remaining end of the bolt 23 as shown in Fig. 2. The periphery of the nut 24 is formed into a worm-wheel meshing with the worm 25 on the shaft 26 rotatable in the bracket 2. The bracket 3 carries elements which are the duplicates of those designated by the numerals 12 to 26 inclusive. To distinguish one set of these elements from the other the two sets are provided with the same numerals, but the set accompanying the bracket 3 has the prime mark added. The shaft 26 extends from the bracket 2 and through the bracket 3 to the bearing 27 in the post 28. The shaft is provided with a hand wheel 29.

The two brake drums 19 and 19' are connected by the usual hoisting drum 30.

The shaft 26 is splined to the worms 25 and 25' so that when the hand wheel 29 is grasped the rotation of the same would rotate the worms 25' and so that the shaft 26 may be moved longitudinally. The opposing ends of the two worms are provided with dental clutch faces 31 and 31' for clutching engagement with the dental clutch members 32 and 32' attached to the shaft 26. The clutch members 32 and 32' are spaced apart so that both may be free from the clutch faces 31 and 31' as shown on Fig. 1, or either one may be moved into locking engagement with the adjacent clutch face.

The drawings show the brake band applied in locking relation to the brake drums. In so applying the brake bands the lever 9 has been brought downwardly from the position shown in Fig. 1 to that shown in Fig. 3. In bringing the lever down the lever 7 causes the shaft 5 to rotate clockwise. This movement of the shaft operates the arms 12 and 12' and the links 14 and 14' so as to move the free ends of the brake bands 17 and 17' to the right which causes the brake bands to be tightened upon the brake drums in an evident manner. These arms act in conjunction with their respective links as members of toggles. The links 21 and 21' also act as toggles with the links 14 and 14' to hold the free ends of the brake bands in proper positions. When the lever 9 is raised from the position shown in Fig. 3 the brake bands are obviously loosened, the slots 22 in the links 21 and 21' allowing slight endwise travel of the links 21 and 21'.

Referring now to Fig. 5, the worm 25 is made fast to the shaft 26 while the worm 25' is made fast to a sleeve 33 loose on the shaft 26. The sleeve 33 is rotated by the hand wheel 34 while the shaft 26 is rotated by the hand wheel 35.

In the usual draw works it is a hazardous task for the operators to make independent adjustment of the two brakes. This invention provides a remote means of making the adjustments whereby the operators' wheels and levers are located close together and close to other control levers of the draw works. By this invention the operators are not required to be in line with the driving chains on the drum sprockets where they would be liable to injury.

I claim:—

1. In a braking mechanism, a plurality of brake bands, an adjusting screw for controlling each band, an adjusting nut working on each screw, and means including clutches thereon for rotating each nut selectively.

2. In a braking mechanism, a plurality of brake bands, a rotatable adjusting device for each brake band, a clutch face on one end of each device, a rotatable shaft slidable in the device and having clutch members spaced apart to interlock with each clutch face separately.

3. In a braking mechanism, a plurality of brake bands, a rotatable adjusting device for each brake band, a rotary means for operating each device, one rotary means being sleeved on the other, and means for rotating each rotary means separately.

4. In a braking mechanism, a hoisting drum, brake drums carried thereby, a brake band on the exterior surface of each brake drum, a non-rotatable anchor bolt connected to one end of each brake band, a nut rotatable on each bolt to adjust the brake bands on the drums, and manual means rotatable about a single axial line for selectively rotating each nut.

5. In a braking mechanism, a plurality of brake bands, a non-rotatable adjusting screw for controlling each band, an adjusting nut rotatable on each screw, means extending on a single axial line to a point remote from the adjusting nuts and adapted to operate each nut separately, and manually operated means connected with the first means and operable from the remote point to actuate the first means.

6. In a brake mechanism, a plurality of brake bands, a non-rotatable adjusting screw for controlling each band, an adjusting nut rotatable on each screw, and a remote means adapted to rotate about a single axial center to actuate each nut selectively for adjusting said brake bands.

7. In a brake mechanism, a plurality of brake bands, a non-rotatable adjusting screw for controlling each band, an adjusting nut rotatable on each screw, a remote means adapted to rotate about a single axial center to actuate each nut separately, and means for actuating the remote means for selectively adjusting said brake bands.

JOHN D. SPALDING.